Figure 1:
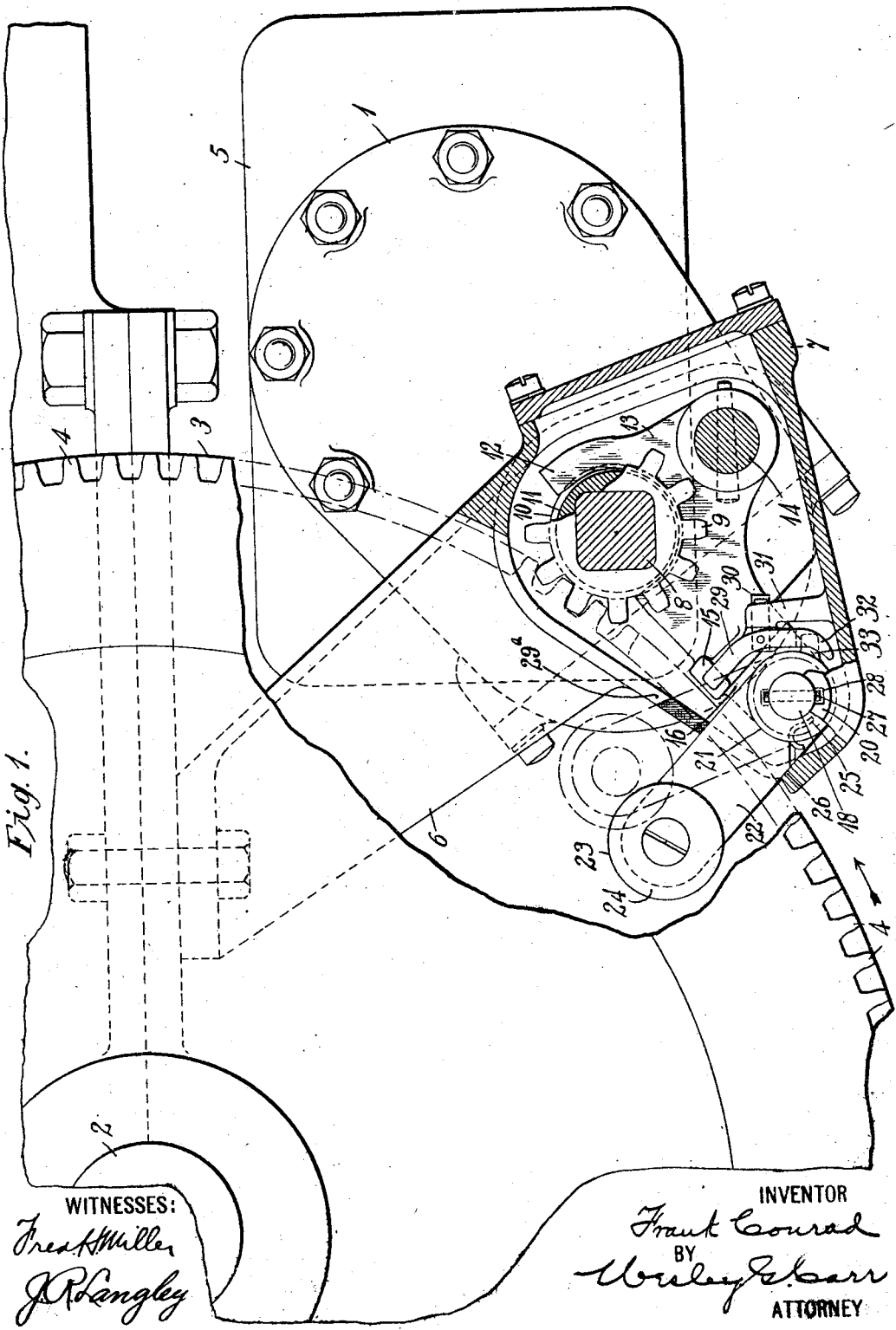

F. CONRAD.
SAFETY DEVICE FOR STARTING MOTORS.
APPLICATION FILED APR. 2, 1913.

1,130,573.

Patented Mar. 2, 1915.
2 SHEETS—SHEET 1.

WITNESSES:
Fred H Miller
J R Langley

INVENTOR
Frank Conrad
BY
Wesley G Carr
ATTORNEY

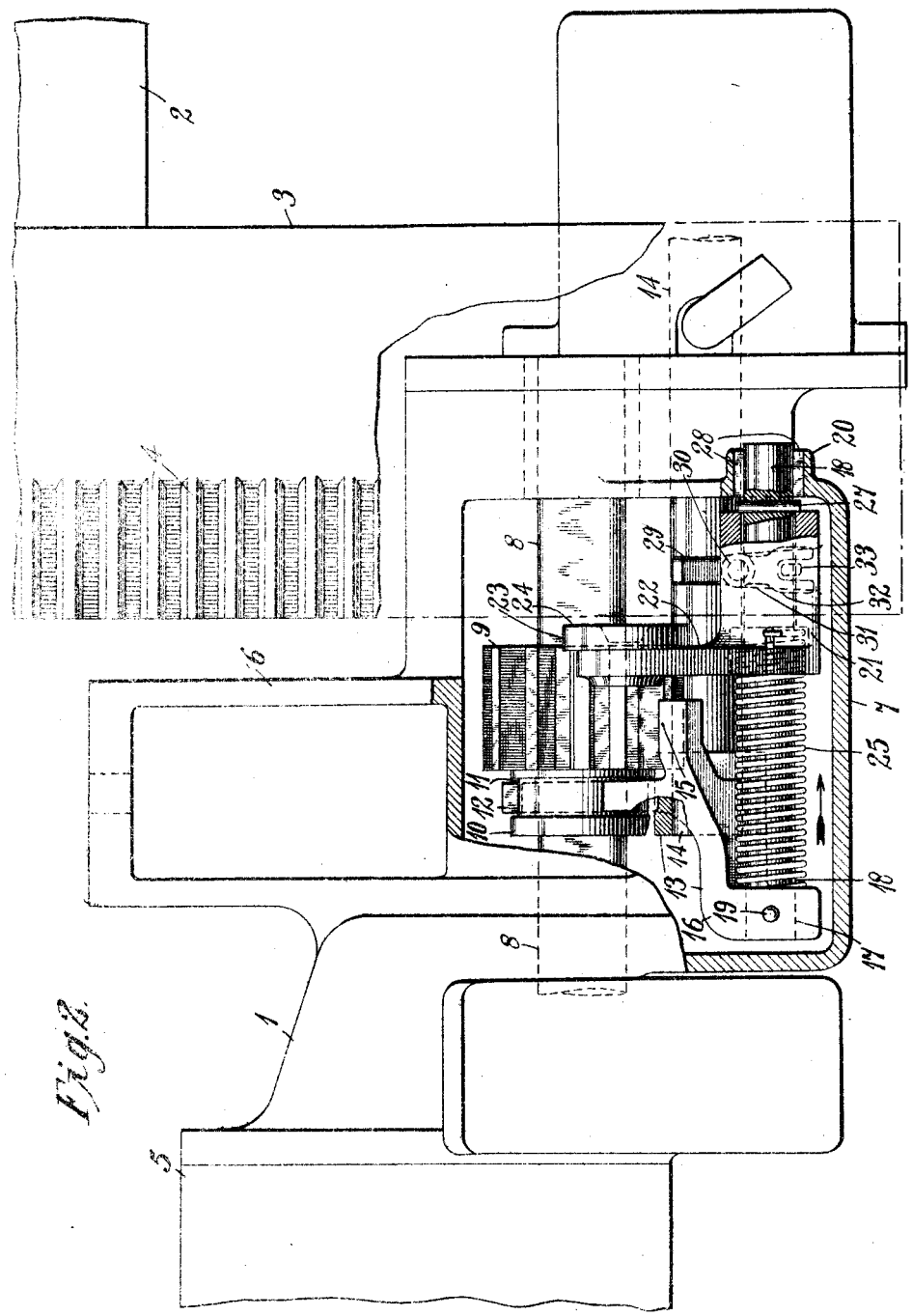

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

SAFETY DEVICE FOR STARTING-MOTORS.

1,130,573.   Specification of Letters Patent.   Patented Mar. 2, 1915.

Application filed April 2, 1913. Serial No. 758,313.

*To all whom it may concern:*

Be it known that I, FRANK CONRAD, a citizen of the United States, and a resident of Swissvale, in the county of Allegheny and State of Pennsylvania, have invented a new and useful Improvement in Safety Devices for Starting-Motors, of which the following is a specification.

My invention relates to safety devices for such starting motors as are employed in the operation of gas engines of automobiles or other motor vehicles.

My invention has for its object to provide a device of the above indicated character which is simple in its operation and which prevents damage to the gear mechanism of starting motors.

In the use of a starting motor for a gas engine of an automobile, it is customary to employ reduction gear mechanism which operatively connects the motor to the engine fly-wheel. When the engine is operating under its own power, the fly-wheel rotates at a high peripheral speed and an attempt to mesh a gear wheel with the gear teeth on the fly-wheel is practically certain to result in damage to the gear teeth.

My invention provides a mechanical construction which engages the fly-wheel in advance of the connecting gear wheel and automatically locks the starting mechanism in an inoperative position in case the fly-wheel is rotating but allows the gear wheels to be meshed if the fly-wheel is stationary.

The details of my invention are described in connection with the accompanying drawings in which—

Figure 1 is an end view, partially in elevation and partially in section, of a portion of the engine structure of an automobile, with a starting mechanism attached thereto. Fig. 2 is a side view of the same, partially in elevation and partially in section.

For the sake of clearness, only a portion of the engine structure is shown, the remaining structure being broken away. The crank case is indicated at 1, the engine shaft at 2, the flywheel at 3, and gear teeth formed in the periphery of the fly-wheel at 4. The motor 5, which is here shown as a dynamo-electric machine, is mounted on a bracket 6 that is attached to the crank case and is integral with a casing 7 which incloses the gear mechanism. The gear mechanism comprises suitable gear wheels for connecting the armature shaft to a shaft 8 upon which a pinion 9 is mounted to slide into and out of mesh with the fly-wheel gear teeth 4. The pinion 9 has an integral collar 10 provided with a groove 11 to be engaged by the arms 12 of a yoke member 13. The yoke member 13 is attached to a shift rod 14 that is connected in any suitable manner to a pedal or lever, not shown, which is within convenient reach of the operator. The yoke member 13 is provided with an arm 15 which projects toward the fly-wheel 3 and is also provided with a second arm 16 having a suitable opening 17 in which a cylindrical rod 18 is fastened by a pin 19. The rod 18 is slidably mounted in a slotted bearing 20 that is integral with the casing 7. A cylindrical sleeve member 21 has a bearing on the rod 18 and is provided with an arm 22 having a disk shaped member 23, the surface 24 of which may be made rough or may be provided with any suitable frictional material such as leather or fiber. A coil spring 25 is mounted on the rod 18 and has one end attached to the arm 16 and the other end to the sleeve 21. The spring 25 normally holds the arm 22 in the position shown in Figs. 1 and 2, against a shoulder 26 on the casing 7 and the sleeve 21 against a pin 27 on the rod 18. The pin 27 is alined with slots 28 in the bearing 20 and endwise movement of the rod 18 is thus permitted. A lever 29 has a pivotal support at 30 in a lug 31 that is integral with the casing 7. The lever 29 is provided at one end with a yoke member 32 to engage a lug 33 on the member 21, and the opposite end of the lever is in alinement with the arm 15.

Assuming that the engine and the starting mechanism are stationary and it is desired to start the engine, the operator presses a starting pedal to actuate the shift rod 14. The yoke member 13 slides the pinion 9 on the shaft 8 toward the flywheel 3 and at the same time moves the rod 18 endwise in the direction of the arrow in Fig. 2. The spring 25 moves the sleeve member 21 in the same direction until the disk member 23 engages the flange of the fly-wheel 3, when the further movement of the yoke member slides the rod 18 in the sleeve member 21 and compresses the spring 25 until the pinion 9 is completely in mesh with the fly-wheel gear 4. Before the end of the shifting movement, the arm 15 engages the lever 29 to rock the latter on its pivot and slide the sleeve member 21 on the rod 18 away from the flywheel 3. This action insures that the disk 23 is not in engagement with the fly-wheel when the latter is rotating to start the engine. The motor is then operated through any suitable electrical connections to rotate the engine shaft by means of the gear mechanism above described. When the fly-wheel rotates, the disk member 23 is carried by it in the direction of rotation until the arm 22 engages the arm 15 but, as may be seen from the relation of these parts as shown in Fig. 1, this movement is relatively small. When the engine starts under its own power, the operator releases the pedal and it may be actuated by any suitable spring (not shown) to retract the shift rod 14 and, with it, the yoke member 13 and the pinion 9. The sleeve member 21 is retracted by the pin 27 and is rotated to its normal position by the torsional force of the spring 25.

In case the operator attempts to mesh the pinion 9 with the fly-wheel gear teeth 4 while the engine is running or the fly-wheel is rotating from any cause, the safety mechanism will effectually prevent the engagement of the gear teeth. As in the operation above described, the disk 23 will engage the flange of the fly-wheel before the pinion 9 engages the gear teeth 4. The frictional engagement between the disk and the fly-wheel will cause the disk to be carried by the fly-wheel and almost instantly rock the arm 22 on the rod 18 to take the position indicated by dotted lines in Fig. 1 against a stop 29ª which is integral with the casing 7. Because of the relatively slight movement required to effect the engagement of the disk and the fly-wheel flange, this rocking movement takes place before the arm 15 passes the arm 22 and, as shown in Fig. 1, the arm 22 is in the path of the arm 15, and further movement of the shiftable mechanism is prevented when the end of the arm 15 engages the arm 22. The parts will be returned to their respective normal positions as before described when the starting pedal is released by the operator.

It is understood that I do not limit myself to the specific details herein described, but I may make such changes and modifications as may fall within the limits of the appended claims.

I claim as my invention:

1. In combination, two gear wheels, one of which is relatively shiftable into and out of mesh with the other, and mechanical means which automatically prevents the meshing of said gear wheels when one of them is rotating.

2. In combination, two gear wheels, one of which is shiftable into and out of mesh with the other, and mechanical means for locking said shiftable gear wheel in an inoperative position upon an attempt to mesh said gear wheels when one of them is rotating.

3. In combination, two gear wheels, one of which is shiftable into and out of mesh with the other, and means for preventing the meshing of said gear wheels when one of them is rotating, said means being operative only when said first gear wheel is shifted.

4. In combination, two gear wheels, one of which is shiftable into and out of mesh with the other, and mechanical means for automatically preventing the meshing of said gear wheels when one of them is rotating, said means being operative only when said first gear wheel is shifted.

5. In combination, a gear wheel, a second gear wheel shiftable into and out of mesh with said first wheel, and means for preventing the engagement of said gear wheels when one of them is rotating, said means comprising a member which engages said first gear wheel in advance of said second gear wheel.

6. In combination, a gear wheel, a second gear wheel shiftable into and out of mesh with said first gear wheel, means for shifting said second gear wheel, and means for locking said second gear wheel in its disengaged position when said first gear wheel is rotating, said means comprising a member which engages said first gear wheel in advance of said second gear wheel.

7. In combination, a gear wheel, a second gear wheel shiftable into and out of mesh with said first gear wheel, and means for preventing the meshing of said gear wheels when one of them is rotating, said means comprising a member mounted to reciprocate with said second gear wheel, a second member normally out of alinement with said first member but pivotally mounted to move into the path of said first member, and means on said second member for engaging said first gear wheel.

8. In combination, a gear wheel, a second gear wheel shiftable into and out of mesh with said first gear wheel, and means for preventing the meshing of said gear wheels when one of them is rotating, said means comprising a member mounted to reciprocate with said second gear wheel, a second member normally out of alinement with said first member but pivotally mounted to move into the path thereof, and means on said second member for engaging said first gear wheel.

9. In a starting mechanism, the combination with an engine shaft, a gear wheel on said shaft, a pinion shiftable into and out of mesh with said gear wheel, of means for preventing the meshing of said pinion with said gear wheel when said gear wheel is rotating, said means comprising a pivotally mounted member adapted to frictionally engage said gear wheel in advance of said pinion, and means for engaging said member.

10. In a starting mechanism, the combination with two gear wheels, one of said gear wheels being shiftable into and out of mesh with the other, and means for shifting said gear wheel, of means for preventing the meshing of said gear wheels when one of them is rotating, said means comprising a pivotally mounted member which engages said second gear wheel in advance of said first gear wheel, and a member shiftable with said pinion which engages said first member when said first member is rocked on its pivot.

11. In combination, a gear wheel, a second gear wheel shiftable into and out of mesh with said first gear wheel, means for preventing the meshing of said gear wheels when said first gear wheel is rotating, said means comprising a pivotally mounted member which frictionally engages said first gear wheel in advance of said second gear wheel, and a second member normally out of alinement with said first member, but which engages it when it is rocked on its pivot.

12. In a starting mechanism, the combination with an engine shaft, a gear wheel on said shaft, a starting motor, a pinion operatively connected to said motor and shiftable into and out of mesh with said gear wheel, and means for shifting said pinion, of a safety device carried by said shifting means, said device comprising two relatively movable arms, one of said arms being reciprocally movable into the path of the other and the second of said arms being rotatable into the path of the first.

13. The combination with a gear wheel and a pinion shiftable into and out of mesh therewith, of a member shiftable with said pinion to engage said gear wheel in advance of said pinion, and means for disengaging said member and said gear wheel before said pinion is completely in mesh with said gear wheel.

14. The combination with two gear wheels, one of which is shiftable into and out of mesh with the other, of a safety device carried by said shiftable gear wheel, said device comprising a member which engages the other of said gear wheels, and means for retracting said member upon the meshing of said gear wheels.

15. The combination with a gear wheel and a second gear wheel shiftable into and out of mesh therewith, of means for preventing the engagement of said gear wheels when one of said gear wheels is rotating, said means comprising a member which engages said first gear wheel, and means for retracting said member upon the meshing of said gear wheels.

16. The combination with two gear wheels, one of which is relatively shiftable into and out of mesh with the other, of means for preventing the meshing of said gear wheels when one of them is rotating.

17. The combination with two gear wheels, one of which is relatively shiftable into and out of mesh with the other, of means for automatically preventing the meshing of said gear wheels when one of them is rotating.

In testimony whereof, I have hereunto subscribed my name this 29th day of March 1913.

FRANK CONRAD.

Witnesses:
R. E. CULLINGS,
B. B. HINES.